United States Patent
Daishin et al.

(10) Patent No.: US 7,315,591 B2
(45) Date of Patent: Jan. 1, 2008

(54) REPRODUCED SIGNAL WAVEFORM PROCESSING APPARATUS

(75) Inventors: Takuya Daishin, Kanagawa (JP); Yoshitaka Miyake, Kanagawa (JP); Hisao Osabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 750 days.

(21) Appl. No.: 10/766,284

(22) Filed: Jan. 28, 2004

(65) Prior Publication Data

US 2004/0246034 A1    Dec. 9, 2004

(30) Foreign Application Priority Data

Jan. 29, 2003    (JP)    ............................. 2003-020549

(51) Int. Cl.
    *H04L 27/06*    (2006.01)
(52) U.S. Cl. ...................... 375/344; 375/229; 375/232; 375/233; 327/165
(58) Field of Classification Search ................ 375/344, 375/229–233, 294, 327; 341/142, 155; 327/165
    See application file for complete search history.

(56) References Cited

U.S. PATENT DOCUMENTS

| | | | |
|---|---|---|---|
| 5,148,382 A | * | 9/1992 | Kishi .......................... 708/306 |
| 5,526,200 A | * | 6/1996 | Yada ............................ 360/51 |
| 6,671,244 B2 | * | 12/2003 | Honma ..................... 369/59.22 |

FOREIGN PATENT DOCUMENTS

| | | |
|---|---|---|
| JP | 5-314654 | 11/1993 |
| JP | 6-77767 | 3/1994 |
| JP | 6-325500 | 11/1994 |
| JP | 8-70235 | 3/1996 |
| JP | 08-106728 | 4/1996 |
| JP | 10-210425 | 8/1998 |
| JP | 11-16295 | 1/1999 |
| JP | 2000-201190 | 7/2000 |

* cited by examiner

*Primary Examiner*—David C. Payne
*Assistant Examiner*—Rahel Guarino
(74) *Attorney, Agent, or Firm*—Frommer Lawrence & Haug LLP; William S. Frommer, Esq.; Thomas F. Presson, Esq.

(57) ABSTRACT

A reproduced signal waveform processing apparatus is provided. The apparatus includes an A/D converter for sampling a reproduced signal at a reproducing clock having a predetermined oscillation frequency; a first equalizer for equalizing a digital reproduced signal from the A/D converter; a second equalizer connected in series with the first equalizer for further equalizing the digital reproduced signal from the first equalizer; a phase frequency controller for detecting a phase frequency error between the digital reproduced signal from the first equalizer and the reproducing clock signal, and outputting a control signal on the basis of a result of the detection; and a variable frequency oscillator for varying the oscillation frequency in accordance with the control signal.

6 Claims, 8 Drawing Sheets

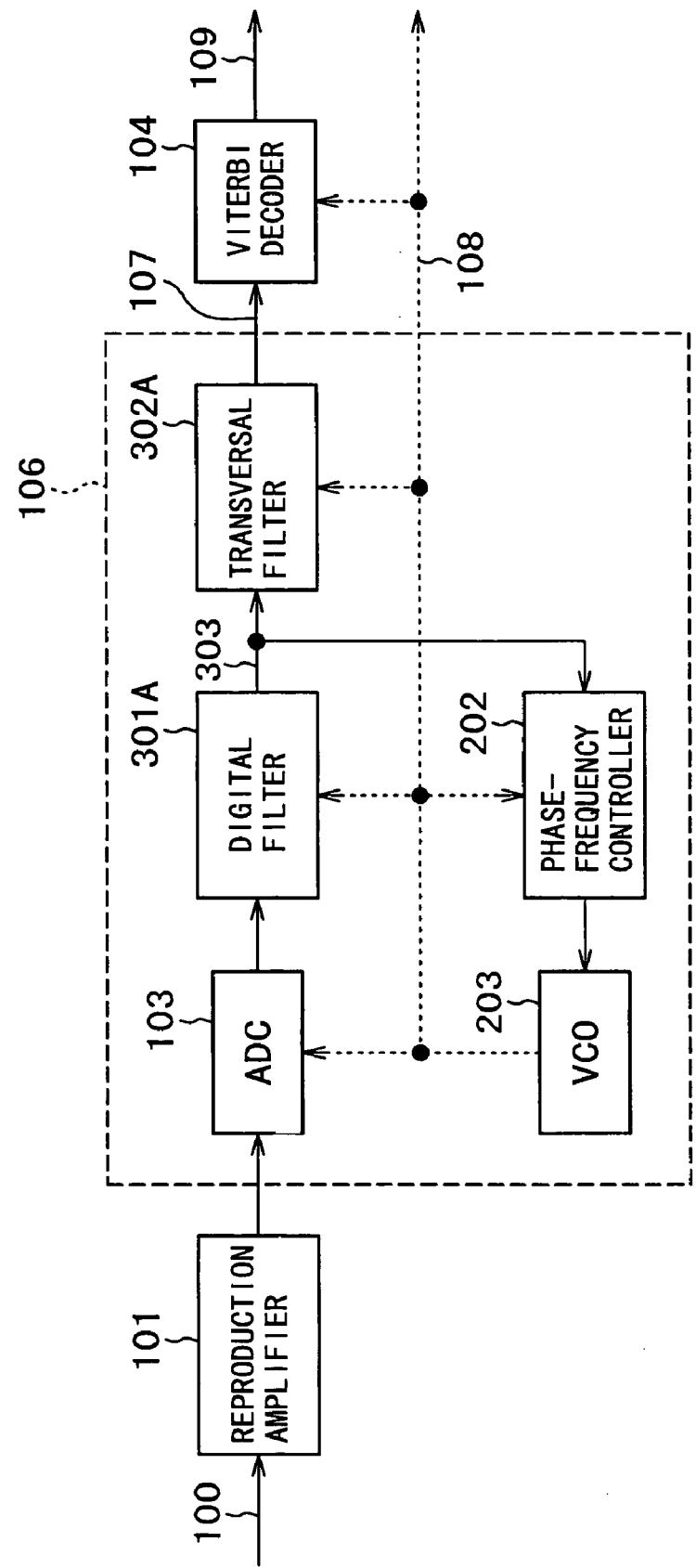
F I G. 3

REPRODUCED SIGNAL WAVEFORM PROCESSING APPARATUS

BACKGROUND OF THE INVENTION

1. Field of the Invention

The present invention relates to a reproduced signal waveform processing apparatus. More specifically, the present invention relates to a reproduced signal waveform processing apparatus for extracting a reproduced digital data by equalizing a waveform of a signal reproduced from a recording medium such as a magnetic medium or the like.

2. Description of Related Art

In a conventional magnetic recording-reproducing apparatus for recording and reproducing digital data, a reproduced signal is equalized, and then, discriminated in a Viterbi decoder or the like for data extraction.

According to such a conventional system, it is required that the sampling of decoding is performed in precise synchronization with the reproduced data, and that the reproduced data is subjected to waveform equalization so as to be easily discriminated.

FIG. 7 is a block diagram showing a conventional reproduced signal waveform processing apparatus used in a magnetic recording-reproducing apparatus, and which mainly consists of: an amplifier 101 for amplifying a reproduced signal 100; an equalizer 102 for equalizing reproduced signal amplified in the amplifier 101; an A/D converter (ADC) for converting a signal equalized in the equalizer 102 into a digital signal of reproduced data 107; a Viterbi decoder 104 for Viterbi-decoding the reproduced data 107 converted in the A/D converter 103; and a phase locked loop (PLL) circuit 105 for performing phase locked looping of a signal equalized in the equalizer 102. Among them, the equalizer 102, the A/D converter (ADC) 103 and the PLL 105 constitute a reproduced signal waveform processing unit 106.

In this arrangement described above, the reproduced signal 100 reproduced by a head is amplified in the amplifier 101, and the waveform thereof is equalized by the equalizer 102. The reproduced data 107 is discriminated in the Viterbi decoder 104. The PLL 105 produces a reproducing clock signal 108 from the reproduced signal that is subjected to waveform equalization in the equalizer 102, and supplies it to the A/D converter 103 and the Viterbi decoder 104. The A/D converter 103 extracts discrete reproduced data 107 by sampling the reproduced signal after the equalization with the reproducing clock signal 108.

Further, the reproducing clock signal 108 is used as a synchronization signal for the Viterbi decoder 104 and subsequent stages in the system. The Viterbi decoder 104 decodes the reproduced data 107 by the maximum likelihood decoding, discriminates digital information magnetically recorded, and outputs it as data 109.

Here, the reproduced signal waveform processing unit 106 is a unit for equalizing the waveform of the reproduced signal 100, and for obtaining a reproduced data 107 which is separated and equalized by subjecting it to the clock extraction and sampling.

In the example shown in FIG. 7, the equalizer 102 for equalizing the reproduced signal and the PLL 105 for extracting the reproducing clock are constituted with analog circuits. However, in order to achieve various objects such as a high precision equalization and clock extraction, elimination of adjustments, a large-scale integration on an LSI chip, a reduced power consumption by integrating the chip with a signal processing IC as well as a reduced cost of manufacture, these equalizer and PLL are desired to be digitalized.

In FIG. 8, there is shown an example, in which its equalizer is digitalized, of a reproduced signal waveform processing unit for use in a magnetic recording-reproducing apparatus system.

In FIG. 7 and FIG. 8, like functions are designated by like reference numerals, and only features which have not been previously described with FIG. 7 will be described below.

An A/D converter (ADC) extracts a discrete reproduced data 107 by sampling the reproduced signal 100 which is amplified in a signal amplifier 101 with a reproducing clock signal 108 which is generated by a voltage controlled oscillator (VCO) 203.

An equalizer 201 equalizes a digital signal digitalized in the A/D converter 103 and outputs it as the reproduced data 107. A phase frequency controller 202 detects phase and frequency error information from the reproduced data 107 after the equalization by executing digital processing, and controls an oscillation frequency of the voltage controlled oscillator (VCO) 203 in accordance with a result of the detection. The voltage controlled oscillator (VCO) 203 varies its oscillation frequency in response to an output of the phase frequency controller 202 so as to obtain the reproducing clock signal 108. The reproducing signal 108 is used as a synchronizing signal not only in the A/D converter 103 but also in the equalizer 201, the Viterbi decoder 104, the phase frequency controller 202 and subsequent stages in the system. Here, a feedback loop including the A/D converter 103, the equalizer 201, the phase frequency controller 202 and the voltage controlled oscillator (VCO) 203 corresponds to the analog PLL 105 shown in FIG. 7, and its reproducing clock signal 108 is enabled to be oscillated in precise synchronization with the reproduced signal 100.

It should be noted that in the digital type of reproduced waveform processing unit 106 shown in FIG. 8, an equalizing characteristic in the equalizer 201 has a critical effect on an error rate of data to be extracted. Therefore, it is required for the digital type of equalizer 201 to be able to precisely equalize an equalization error contained in the reproduced signal 100.

On the other hand, in the case where the equalizer 201 in the digital type waveform processing unit is realized by utilizing a digital system, some delay may occur per unit clock. This delay becomes a dead time element in the PLL, reducing a phase margin in its control system, thereby restraining a loop gain in the PLL. That is, when its gain is set at an higher value in order to realize a fast pull-in, there may be a problem such that, in a system having a large dead time element in the feedback control of the PLL, the phase margin is substantially reduced and causes instability in the system.

Here, we consider an application of the reproduced waveform processing unit described above to a magnetic recording-reproducing apparatus system, which utilizes a helical scan recording/reproducing of information on and from, for example, a magnetic tape. The equalization characteristics required for the equalizer 201 shown in FIG. 8 are, for example, an LPF characteristic for DC cut-off, an inverse characteristic to electromagnetic conversion, and a Nyquist filtering characteristic.

An equalizer that may realize these characteristics described above may be realized by using an IIR (Infinite Impulse Response) filter for reducing a low frequency region, achieving an integrating equalization, a high frequency region enhancement and attenuating a Nyquist frequency region. However, in order to be able to strictly satisfy these filter characteristics matching with target characteristics, the system becomes more complicated, and due to an increased amount of digital processing involved, dead time elements may increase. Further, for the helical scan type magnetic recording-reproducing apparatus, it is even required to equalize variations and fluctuations of products, which are inherent in constituting elements such as a tape, a magnetic recording/reproducing head, a rotary transformer that cannot be avoided in the manufacture thereof. For the equalizer in the arrangement described above, although a degree of freedom or system flexibility is increased because of an increased number of parameters, it becomes very difficult to perform a parameter setting for optimal equalization thereof.

Alternatively, we consider a case in which the equalizer 201 in FIG. 8 includes a transversal filter. In this case, with regard to the equalization of frequency characteristics, it is possible to provide measures for fluctuations in manufacturing of constituent elements by employing adaptive equalization using an automatic equalization method such as an LMS (Least Mean Square) algorithm.

An example of the conventional apparatus described above is disclosed in Japan Patent Application Laid-Open Publication No. H07-302467, pp. 3-4 and FIG. 1.

SUMMARY OF THE INVENTION

However, in the conventional feedback loop described above, because of interference with the PLL loop, the adaptive phase equalization may not be realized. In addition, in order to obtain a sufficient waveform equalizing performance, it is preferable that the number of taps in the transversal filter is increased.

In particular, in a helical scanning type magnetic recording-reproducing apparatus system, there is a case in which a low frequency tracking servo signal is extracted from a reproduced signal, and then a tracking servo operation is performed. This tracking servo signal is 465 kHz, 697 kHz in the case of a home digital video camera (DVC), thereby a quite large number of taps may be required if the low frequency range enhancement characteristic of the integrating equalization is to be extended to cover the vicinity of the aforementioned tracking servo signal. Accordingly, in the case where the equalizer is constructed using a transversal filter, because of an increase in the dead time element in the PLL, there occur such problems that it is difficult to increase a loop gain thereof, and that a wide pull-in range frequency characteristic and a quick responsiveness are difficult to secure.

Accordingly, it is desirable to realize a digital type reproduced signal waveform equalizer having an excellent waveform equalization characteristic implemented in a relatively compact circuit configuration, in which a digital type phase locked loop (PLL) circuit enabling a wider pull-in frequency range and a faster pull-in capability is included.

According to one embodiment of the present invention, a reproduced signal waveform processing apparatus is provided.

(1) A reproduced signal waveform processing apparatus according to an embodiment of the invention has a feedback loop, which includes: sampling means for sampling a reproduced signal at an interval of a reproducing clock signal generated at a predetermined oscillation frequency; a first equalizer for equalizing a digital reproduced signal obtained by the sampling means; phase frequency control means for detecting a phase error at a frequency between the digital reproduced signal equalized in the first equalizer and the reproducing clock signal, and outputting a control signal in accordance with phase frequency error information between the digital reproduced signal and the reproducing clock signal; oscillation means for varying a oscillation frequency in accordance with an instruction from the phase frequency control means, wherein the feedback loop is a synchronization circuit that functions as a PLL for synchronizing frequency phase between the digital reproduced signal and the reproducing clock signal, and further includes a second equalizer connected in series with the first equalizer.

(2) In the reproduced signal waveform processing apparatus as described in item (1) above, the second equalizer means may include an adaptive equalizer having an automatic equalization function based on a LMS algorithm or the like.

(3) In the reproduced signal waveform processing apparatus as described in item (1) above, the first equalizer may include an IIR filter for reducing dead time element in the phase locked loop.

(4) In the reproduced signal waveform processing apparatus as described in item (1) above, the phase frequency control means may include a FIR (Finite Impulse Response) filter for performing equalization to facilitate easy detection of the phase error at a frequency between the digital reproduced signal of the first equalizer and the reproducing clock signal.

(5) In the reproduced signal waveform processing apparatus as described in item (1) above, an operating clock of the feedback loop may be operated at a frequency that is a multiplication of an operating clock of the second equalizer.

(6) The reproduced signal waveform processing apparatus as described in item (1) above may further include a decimation filter provided between the first and the second equalizers for absorbing a difference in the operating clocks therebetween, and a frequency divider for dividing the reproducing clock signal in the feedback loop and generating a reproducing clock signal to be supplied to the second equalizer.

As described hereinabove, by provision of the feedback loop operating as the PLL including the sampling means, the first equalizer, the phase frequency control means and the variable frequency oscillation means, and further provision of the second equalizer connected in series with the first equalizer for absorbing a residual equalization error in the first equalizer, it is not necessary for the first equalizer to perform strict equalization, thereby making it possible to reduce the dead time element in the first equalizer and realize a high speed responsiveness of the PLL. Further, as the equalization error in the first equalizer is equalized subsequently in the second equalizer, it becomes possible to achieve an optimum waveform equalization characteristic required therefor.

As described above, in the reproduced signal waveform processing apparatus according to the embodiments of the present invention, because the first equalizer constituting the PLL is separated from the second equalizer, and because the second equalizer ensures performance of more strict equalization operation, the first equalizer may be relieved from the necessity of realizing the stricter equalization characteristic. Accordingly, all the equalization characteristics required for the first equalizer is ones that may be adequately realized by a phase locked loop (PLL) that is formed by the A/D converter, the first equalizer, the phase frequency controller and the voltage controlled oscillator, thereby, advantageously, it becomes possible to provide an equalizer having a simple design and a minimal dead time element.

Further, according to the embodiments, the total dead time in the phase locked loop may be substantially reduced, and a higher loop gain may be set. Accordingly, it becomes possible to achieve a wider pull-in frequency range and a higher frequency tracking capability.

Still further, because the second equalizer is provided for eliminating the residual equalization error remaining in the equalized data from the first equalizer, it becomes possible to minimize the error rate thereof.

Furthermore, because all it is required for the second equalizer is to equalize the residual equalization error, the circuitry of the second equalizer may be made more compact.

By separating the first equalizer and the second equalizer and constituting the second equalizer with a transversal filter having an automatic equalization function based on, for example, the LMS theory, it becomes possible to separate the second equalizer from a phase locked loop. Accordingly, it is possible to prevent the interference between the phase locked loop and the phase equalization characteristics of the second equalizer, and to realize a reproduced signal waveform processing apparatus in which equalization characteristics are optimized, the error rate is minimized, and no adjustments are required for adjusting for the variations in the products such as tapes, reproducing heads and the like, or ageing fluctuations thereof.

Still further, because it is only the remaining equalization error that is required for the second equalizer to equalize, and lower frequency region is not required to be equalized, the number of taps in the second equalizer may be reduced. Accordingly, the scale of the circuitry thereof may be reduced.

By constructing the first equalizer with an IIR type integrating equalizer, a differential equalizer for enhancing higher frequency region, a phase equalizer for equalizing phases, a high frequency cut-off filter for attenuating Nyquist frequency region, and a low frequency region cut-off filter for eliminating DC component, the dead time element may be substantially reduced. Because the total dead time in the phase locked loop is reduced, it is possible to set the loop gain higher, and to obtain a wider pull-in frequency range and a higher frequency tracking capability.

By provision of the third equalizer, the frequency and phase characteristics of a signal to be inputted to the phase frequency controller may be varied. Accordingly, it becomes possible to positively generate such an error characteristic that the error may be more easily detectable by the phase frequency controller. Accordingly, it becomes possible to permit a wider range of variations in products such as tapes, reproducing heads and/or the characteristic fluctuations resulting from ageing thereof.

Still further, by provision of the first decimation filter provided between the first equalizer and the second equalizer, and by provision of the second decimation filter provided in a reproducing clock line between the first and the second equalizers, the operating clock in the phase locked loop on the side of the first equalizer, which forms the PLL, may be increased, thereby allowing a higher loop gain thereof. Accordingly, it becomes possible to obtain a wider pull-in frequency range and a higher frequency tracking capability.

BRIEF DESCRIPTION OF THE DRAWINGS

The above and other objects, features and advantages of the present invention will become more apparent from the following description of the presently exemplary embodiment of the invention taken in conjunction with the accompanying drawings, in which:

FIG. 3 is a schematic block diagram showing a reproduced waveform processing apparatus according to a third embodiment of the present invention;

DETAILED DESCRIPTION OF THE EMBODIMENTS

A reproduced signal waveform processing apparatus according to embodiments of the present invention will be described with reference to the accompanying drawings.

Figure 1:
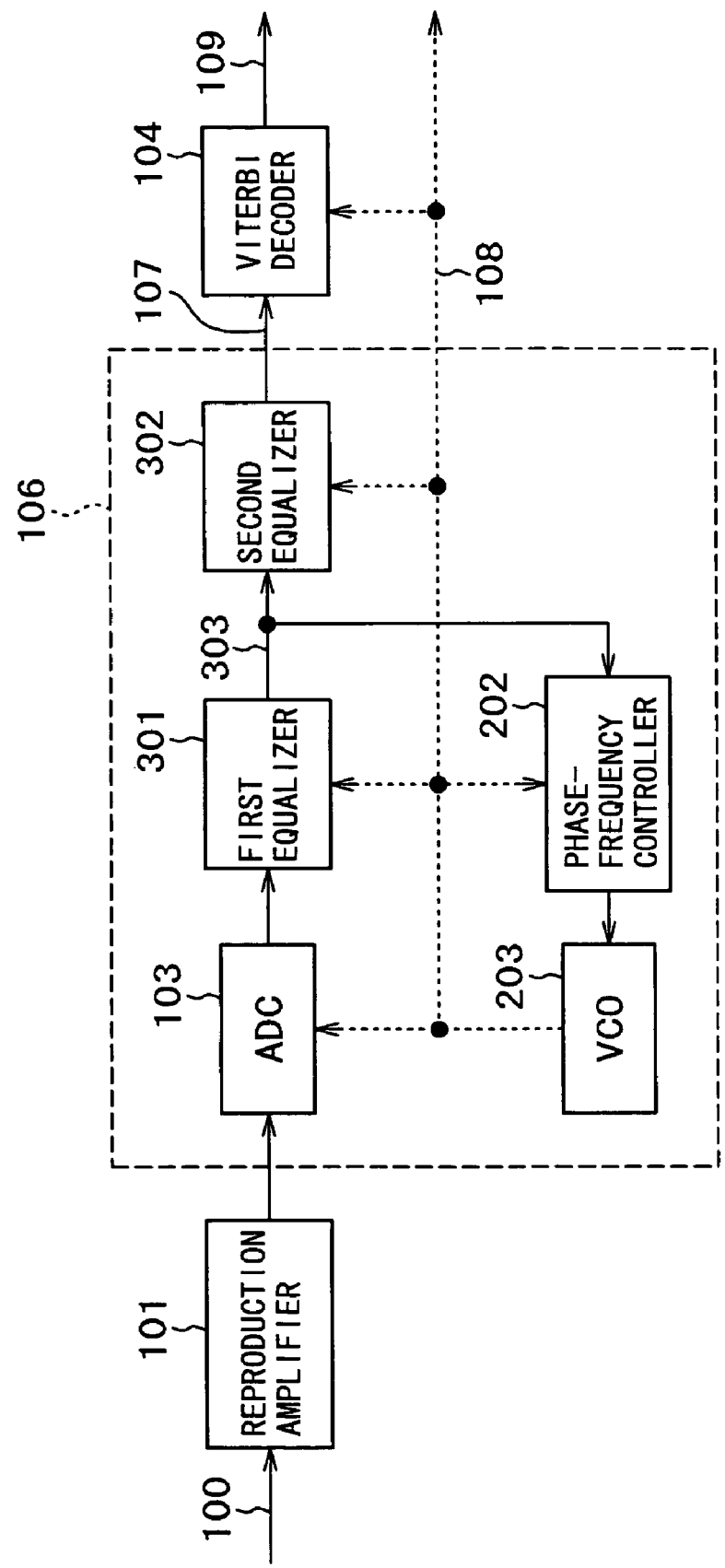
FIG. 1 is a schematic block diagram showing a reproduced waveform processing apparatus according to a first embodiment of the present invention.

By referring to FIG. 1, a reproduced signal waveform processing apparatus according to a first embodiment of the present invention includes: an amplifier 101 for amplifying a reproduced signal 100 obtained from a magnetic medium via a reproducing head; an A/D converter (ADC) 103 for generating a reproduced digital data by sampling the reproduced signal amplified in the amplifier 101; a first equalizer for equalizing the digital data obtained in the A/D converter 103; a second equalizer connected in series with the first equalizer for equalizing an equalized data 303 generated by the first equalizer 301 and inputted thereto; a Viterbi decoder 104 for Viterbi-decoding a reproduced data 107 generated by the second equalizer 302 and for outputting data 109; a phase frequency controller 202 that accepts inputs of the equalized data 303 generated in the first equalizer 301 and a reproducing clock signal 108 for detecting phase frequency error information and outputting a control signal in accordance with a result of the detection; and a voltage controlled oscillator (VCO) 203 for varying its oscillation frequency in response to the control signal from the phase frequency controller 202, and outputting a reproducing clock signal 108. The reproducing clock signal 108 outputted from the voltage controlled oscillator 203 is inputted the A/D converter 103, the first equalizer 301, the second equalizer 302, the Viterbi decoder 104, the phase frequency controller 202, serving as a synchronizing clock signal for subsequent system stages.

Among them described above, the A/D converter 103, the first equalizer 301, the phase frequency controller 202 and the voltage controlled oscillator 203 constitute a feedback loop. Further, this feedback loop and the second equalizer 302, which is connected in series with the first equalizer, in combination, constitute the reproduced signal waveform processing apparatus 106 according to this embodiment of the present invention.

In the reproduced signal waveform processing apparatus having the above-mentioned structure, the reproduced signal 100 obtained from the magnetic medium via the reproducing head is inputted to the A/D converter 103 via the amplifier 101. An output signal from the A/D converter 103 is inputted to the first equalizer 301. Equalized data 303 outputted from the first equalizer 301 is inputted to the second equalizer 302 and to the phase frequency controller 202. An output from the phase frequency controller 202 is inputted to the voltage controlled oscillator 203. The voltage controlled oscillator 203 outputs a reproducing clock signal 108. Reproduced data 107 outputted from the second equalizer 302 is discriminated in the Viterbi decoder 104 and outputted as data 109.

As described above, the reproduced signal 100 reproduced from the magnetic medium via the reproducing head is amplified in the signal amplifier 101, and subjected to sampling in the A/D converter 103 which serves as separating means so as to obtain a reproduced digital data. The first equalizer 301 executes digital processing of the digital signal obtained from the A/D converter 103 so as to output equalized data 303 to the second equalizer 302 and the phase frequency controller 202. The phase frequency controller 202 detects phase frequency error information between the equalized data 303 and a reproducing clock signal 108 generated in the means to be described later, and outputs a control signal in accordance with a result of the detection. The voltage controlled oscillator 203, which serves as oscillation means, varies its oscillation cycle in accordance with the control signal fed from the phase frequency controller 202, and outputs the reproducing clock signal 108.

Here, a feedback loop, which includes the A/D converter 103, the first equalizer 301, the phase frequency controller 202 and the voltage controlled oscillator 203, forms a phase locked loop (PLL) for the reproduced signal 100 and the reproducing clock 108.

On the other hand, the second equalizer 302 equalizes an equalization error remaining in the equalized data 303, and outputs it as a reproduced data 107. The Viterbi decoder 104 obtains data 109 from the reproduced data 107 which is equalized in the second equalizer 302 by Viterbi decoding therein.

By separating the first equalizer 301 which constitutes the PLL and the second equalizer 302 as described above, the first equalizer 301 is freed from a burden of implementing strict equalization characteristics because the second equalizer 302 is expected to execute the strict equalization consecutively.

Further, because the equalization characteristics required for the first equalizer 301 are only such equalizing characteristics that are adequate for implementing the phase locked loop (PLL) including the A/D converter 103, the first equalizer 301, the phase frequency controller 22 and the voltage controlled oscillator 203, it becomes possible to design an equalizer that has a simpler configuration and less dead time elements.

According to the above described features, the total dead time in the phase locked loop may be decreased, and the loop gain may be set at a high value. Accordingly, it becomes possible to achieve a wider pull-in frequency range and an higher frequency tracking capability.

Further, as the second equalizer 302 eliminates a residual equalization error remaining in the signal from the first equalizer 301, it becomes possible to decrease the error rate therein.

Still further, as all it is required for the second equalizer to do is equalization of the residual equalization error, the circuit configuration thereof may be made more compact.

Next, by referring to FIG. 2, a reproduced signal waveform processing apparatus according to a second embodiment of the present invention will be described.

Figure 2:
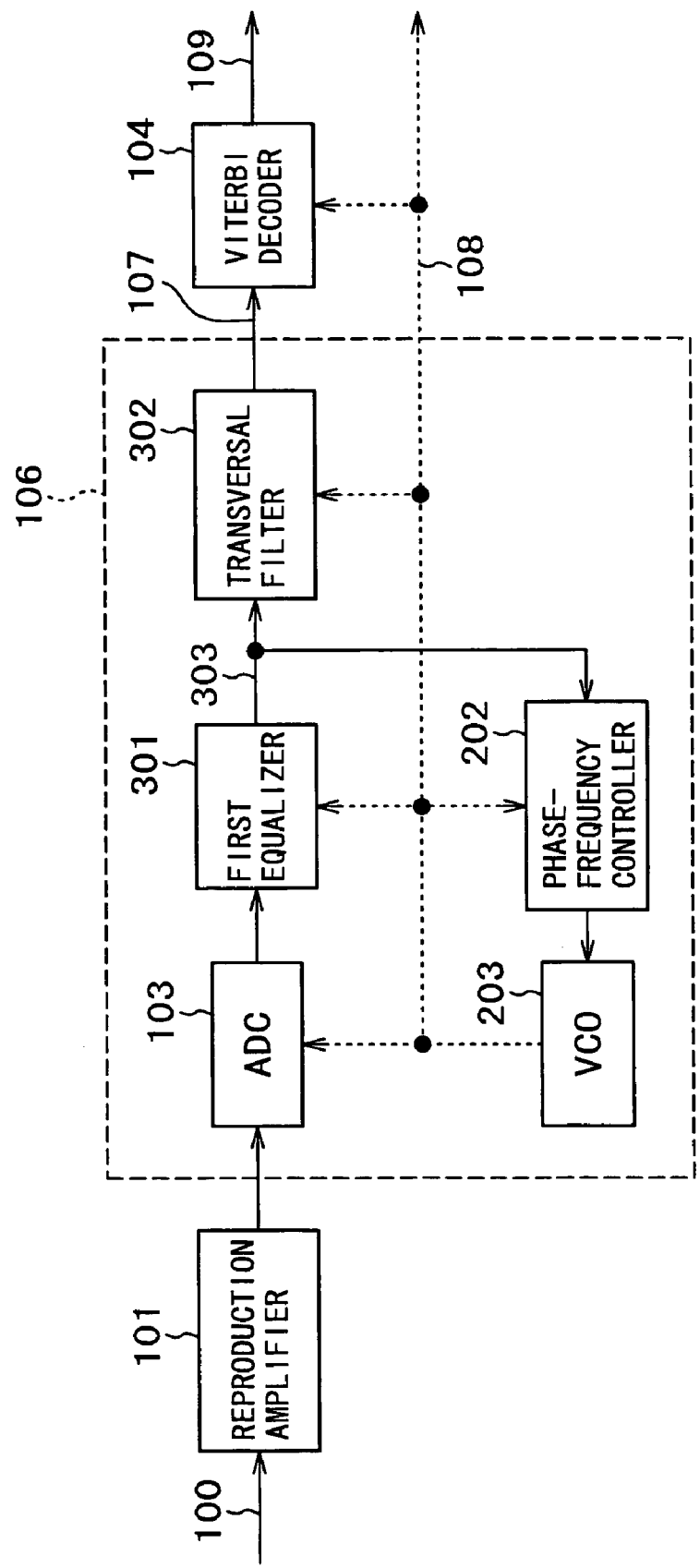
FIG. 2 is a schematic block diagram showing a reproduced waveform processing apparatus according to a second embodiment of the present invention.

The reproduced signal waveform processing apparatus according to the second embodiment of the present invention, in which the second equalizer 302 described above in the first embodiment is replaced by a transversal filter, has a configuration as shown in FIG. 2, which includes: a signal amplifier 101 for amplifying a reproduced signal 100 obtained from a magnetic medium via a reproducing head; an A/D converter (ADC) 103 for generating a reproduced digital data by sampling a signal amplified in the amplifier 101; a first equalizer 301 for equalizing the digital data obtained in the A/D converter 103; a transversal filter 302A, which corresponds to the second equalizer described in the first embodiment, connected in series with the first equalizer 301 for equalizing an equalized data 303 generated in the first equalizer 301; a Viterbi decoder 104 for Viterbi-decoding a reproduced data 107 generated in the transversal filter 302A and for outputting data 109; a phase frequency controller 202, to which the equalized data 303 from the first equalizer 301 and a reproducing clock signal 108 are inputted, for detecting phase frequency error information and outputting a control signal in accordance with a result of the detection; and a voltage controlled oscillator (VCO) 203 for varying its oscillation cycle in accordance with the control signal from the phase frequency controller 202, and outputting a reproducing clock signal 108. The reproducing clock signal 108 outputted from the voltage controlled oscillator 203 is inputted to the A/D converter 103, the first equalizer 301, the transversal equalizer 302 corresponding to the second equalizer, the Viterbi decoder 104, and the phase frequency controller 202, as a synchronizing clock signal for subsequent system stages.

Among them, the A/D converter 103, the first equalizer 301, the phase frequency controller 202 and the voltage controlled oscillator 203 constitute a feedback loop which constitutes a PLL. Further, in conjunction with this feedback loop, the transversal filter 302A connected in series with the first equalizer 301 constitutes the reproduced signal waveform processing apparatus 106.

The transversal filter 302A is provided for equalizing a residual equalization error remaining in the signal from the first equalizer 301, and, for example, is arranged to be able to equalize the error automatically and adaptively based on a LMS method.

According to the reproduced signal waveform processing apparatus having the aforementioned configuration, the reproduced signal 100 reproduced from the magnetic medium via the reproducing head is amplified by the amplifier 101, then, subjected to sampling in the A/D converter 103 which is the separating means so as to obtain a reproduced digital data. The first equalizer 301 executes digital processing of the digital data obtained from the A/D converter 103, and outputs an equalized data 303. The equalized data 303 is supplied to the transversal filter 302A and the phase frequency controller 202. The phase frequency controller 202 detects phase frequency error information between the equalized data 303 and a reproducing clock signal 108 generated by means to be described in the following, and then, outputs a control signal in accordance with a result of the detection. The voltage controlled oscillator 203, which serves as the oscillation means, varies its oscillation cycle in accordance with the control information fed from the phase frequency controller 202, and outputs the reproducing clock signal 108.

Here, a feedback loop, which includes the A/D converter 103, the first equalizer 301, the phase frequency controller 202 and the voltage controlled oscillator 203, forms a phase locked loop (PLL) for the reproduced signal 100 and the reproducing clock signal 108.

On the other hand, the transversal filter 302A is provided for equalizing equalization error remaining in the equalized data 303, and outputs its result as a reproduced data 107. The Viterbi decoder 104 obtains data 109 through Viterbi-decoding thereof from the reproduced data 107 which is equalized in the transversal filter 302A.

As described hereinabove, the transversal filter 302A may be separated by the phase locked loop by separating the first equalizer 301 and the transversal filter 302A, which corresponds to the second equalizer and constructing the transversal filter 302A with, for example, a transversal filter having an automatic equalization function based on the LMS method. Accordingly, it is possible to eliminate interference in the phase equalization characteristics between the phase locked loop and the transversal filter 302A corresponding to the second equalizer. Furthermore, it becomes possible to optimize the equalization characteristics of the reproduced signal waveform processing apparatus, and accordingly to minimize the error rate thereof. Still further, it is possible to realize a reproduced signal waveform processing apparatus that may eliminate adjustment requirements in order to cope with any fluctuations in manufacturing of tapes, reproducing heads and the like, and ageing thereof.

Further, since all it is required to do for the transversal equalizer, which corresponds to the second equalizer, is equalization of the remaining equalization error, and the equalization of the low frequency part is not required. Accordingly, the number of taps required may be reduced, and the size of its circuit may be made more compact.

Next, by referring to FIG. 3, a reproduced signal waveform processing apparatus according to a third embodiment of the present invention will be described.

The reproduced signal waveform processing apparatus according to the third embodiment of the present invention has a configuration as shown in FIG. 3, in which the first equalizer 301 described above in the second embodiment is replaced by a simple IIR type digital filter, and the configuration of which includes: a signal amplifier 101 for amplifying a reproduced signal 100 obtained from a magnetic medium via a reproducing head; an A/D converter (ADC) 103 for generating a reproduced digital data by sampling amplified signals from the amplifier 101; a digital filter 301A, which corresponds to the first equalizer, for equalizing the digital data from the A/D converter 103; a transversal filter 302A, which corresponds to the second equalizer, connected in series with the digital filter 301A for equalizing an equalized data 303 generated in the digital filter 301A inputted therefrom; a Viterbi decoder 104 for Viterbi-decoding a reproduced data 107 supplied from the transversal filter 302A and outputting data 109; a phase frequency controller 202, which accepts the equalized data generated in the digital filter 301A and a reproducing clock signal 108, for detecting a phase frequency error information, and outputting a control signal in accordance with a result of the detection; and a voltage controlled oscillator (VCO) 203 for varying the oscillation cycle thereof in accordance with the control signal generated in the phase frequency controller 202, and outputting a reproducing clock signal 108. Next, the reproducing clock signal 108 outputted from the voltage controlled oscillator 203 is inputted to the A/D converter 103, digital filter 301A, the transversal filter 302A, the Viterbi decoder 104 and the phase frequency controller 202, as a system synchronization clock signal for subsequent stages.

Among them, the A/D converter 103, the digital filter 301A, the phase frequency controller 202 and the voltage controlled oscillator 203 form a feedback loop which constitutes a PLL. In addition, this feedback loop and the transversal filter 302A connected in series with the digital filter 301A constitute the reproduced signal waveform processing apparatus according to the third embodiment of the present invention.

The digital filter 301A corresponding to the first equalizer is a so-called IIR type filter, and includes an IIR type integrating equalizer, a high frequency enhancing differential equalizer, a phase equalizer for equalizing phases, a high frequency cut-off filter for attenuating a Nyquist frequency region, and a low frequency cut-off filter for cutting off a DC component.

The transversal filter 302A corresponding to the second equalizer is provided for equalizing a residual equalization error still remaining in the equalized data from the digital filter 301A, and has an arrangement for equalizing it automatically and adaptively using, for example, the LMS method.

Accordingly, by constituting the digital filter 301A, which corresponds to the first equalizer for constituting the PLL, with the IIR type integrating equalizer, the high frequency enhancing differential equalizer, the phase equalizer for equalizing phases, the high frequency cut-off filter for attenuating a Nyquist frequency region, and the low frequency cut-off filter for cutting off a DC component, the dead time element may be reduced. Accordingly, as the total dead time in the phase locked loop may be reduced substantially and a higher loop gain may be set, it becomes possible to obtain a wider pull-in frequency range and a higher frequency tracking capability.

Figure 4:
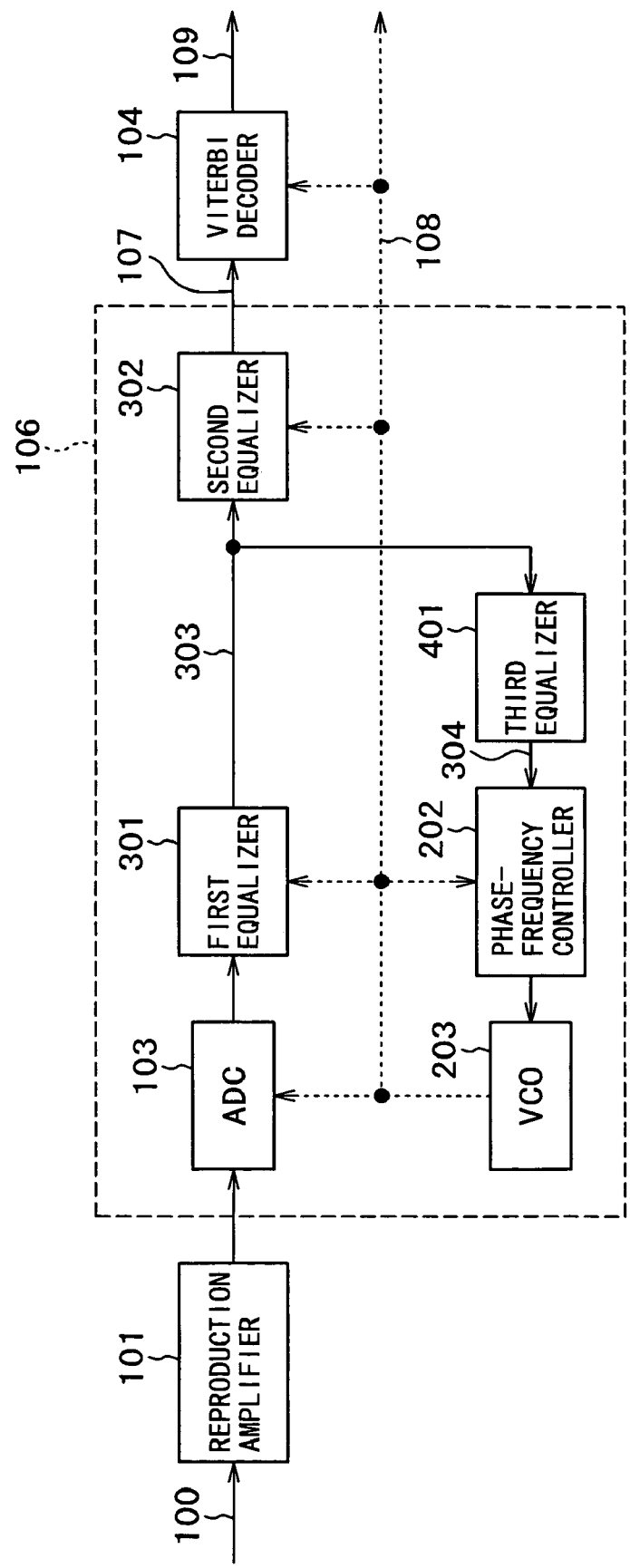
FIG. 4 is a schematic block diagram showing a reproduced waveform processing apparatus according to a fourth embodiment of the present invention.

Next, by referring to FIG. 4, a reproduced signal waveform processing apparatus according to a fourth embodiment of the present invention will be described.

The reproduced signal waveform processing apparatus according to the fourth embodiment of the present invention has an arrangement in which an output from the first equalizer 301 described in the first embodiment above is further equalized in a third equalizer 401 so as to have a characteristic waveform that is easier to handle in a phase frequency controller 202. As shown in FIG. 4, the reproduced signal waveform processing apparatus includes: a signal amplifier 101 for amplifying a reproduced signal 100 obtained from a magnetic medium via a reproducing head; an A/D converter (ADC) 103 for generating a reproduced digital data by sampling amplified signals from the amplifier 101; a first equalizer 301 for equalizing the digital data obtained in the A/D converter 103; a second equalizer 302 connected in series with the first equalizer 301 for equalizing an equalized data 303 generated by the first equalizer 301; a Viterbi decoder 104 for Viterbi-decoding a reproduced data 107 generated by the second equalizer 302 and outputting data 109; a third equalizer 401 for equalizing the equalized data 303 generated by the first equalizer 301 and outputting an equalized data 304; a phase frequency controller 202 for accepting the equalized data 304 from the third equalizer 401 and a reproducing clock signal 108, detecting a phase frequency error information and outputting a control signal in accordance with a result of the detection; and a voltage controlled oscillator (VCO) 203 for varying the oscillation cycle thereof in accordance with the control signal from the phase frequency controller 202 and outputting a reproducing clock signal 108. Next, the reproducing clock signal 108 outputted from the voltage controlled oscillator 203 is supplied to the A/D converter 103, the first equalizer 301, the second equalizer 302, the Viterbi decoder 104, and the phase frequency controller 202, as a system synchronizing clock signal for the subsequent stages in the system.

Among them, the A/D converter 103, the first equalizer 301, the third equalizer 401, the phase frequency controller 202, and the voltage controlled oscillator 203 form a feedback loop, and which constitutes a PLL. Further, this feedback loop and the second equalizer 302 connected in series with the first equalizer 301 form the reproduced signal waveform processing apparatus 106 according to the fourth embodiment of the present invention.

In the reproduced signal waveform processing apparatus having the above-mentioned configuration according to the fourth embodiment of the present invention, the reproduced signal obtained from the magnetic medium via the reproducing head is inputted to the A/D converter 103 through the amplifier 101, and an output from the A/D converter 103 is inputted into the first equalizer 301. The equalized data 303 which is an output from the first equalizer 301 is inputted to the second equalizer 302 as well as to the third equalizer 401. The equalized data 304 equalized in the third equalizer 401 is inputted into the phase frequency controller 202, and an output therefrom is inputted to the voltage controlled oscillator 203. The voltage controlled oscillator 203 outputs the reproducing clock signal 108. The reproduced data 107 outputted from the second equalizer 302 is discriminated in the Viterbi decoder 104, and is outputted as data 109 therefrom.

As described above, the reproduced signal 100 reproduced from the magnetic medium via the reproducing head is amplified in the amplifier 101, subjected to sampling in the A/D converter 103, which serves as separating means, so as to obtain a reproduced digital data. The first equalizer 301 executes digital processing of the digital signal obtained by the A/D converter 103 so as to generate the equalized data 303, which is supplied to the second equalizer 302 as well as to the third equalizer 401, and the equalized data 304 equalized in the third equalizer 401 is supplied to the phase frequency controller 202. The phase frequency controller 202 detects a phase frequency error information for the equalized data 304 and the reproducing clock signal 108 generated by means to be described in the following, and outputs a control signal based on a result of the detection. The voltage controlled oscillator 203, which serves as the oscillating means, varies the oscillating cycle thereof in accordance with the control signal supplied from the phase frequency controller 202, and outputs the reproducing clock signal 108.

Here, a feedback loop consisting the A/D converter 103, the first equalizer 301, the third equalizer 401, the phase frequency controller 202 and the voltage controlled oscillator 203 forms a phase locked loop (PLL) for the reproduced signal 100 and the reproducing clock 108.

On the other hand, the second equalizer 302 equalizes an equalization error remaining in the equalized data 303 and outputs it as the reproduced data 107. The Viterbi decoder 104 obtains data 109 through Viterbi-decoding from the reproduced data 107 equalized in the second equalizer 302.

By provision of the third equalizer 401 for varying the frequency and phase characteristics of the signal to be input to the frequency controller 202, it becomes possible to positively create particular characteristics the error detection of which becomes substantially easier to the phase frequency controller 202. Accordingly, it becomes possible to allow a wider range of variations in products such as tapes, reproducing heads and the like, as well as fluctuations resulting from aging thereof.

Figure 5:
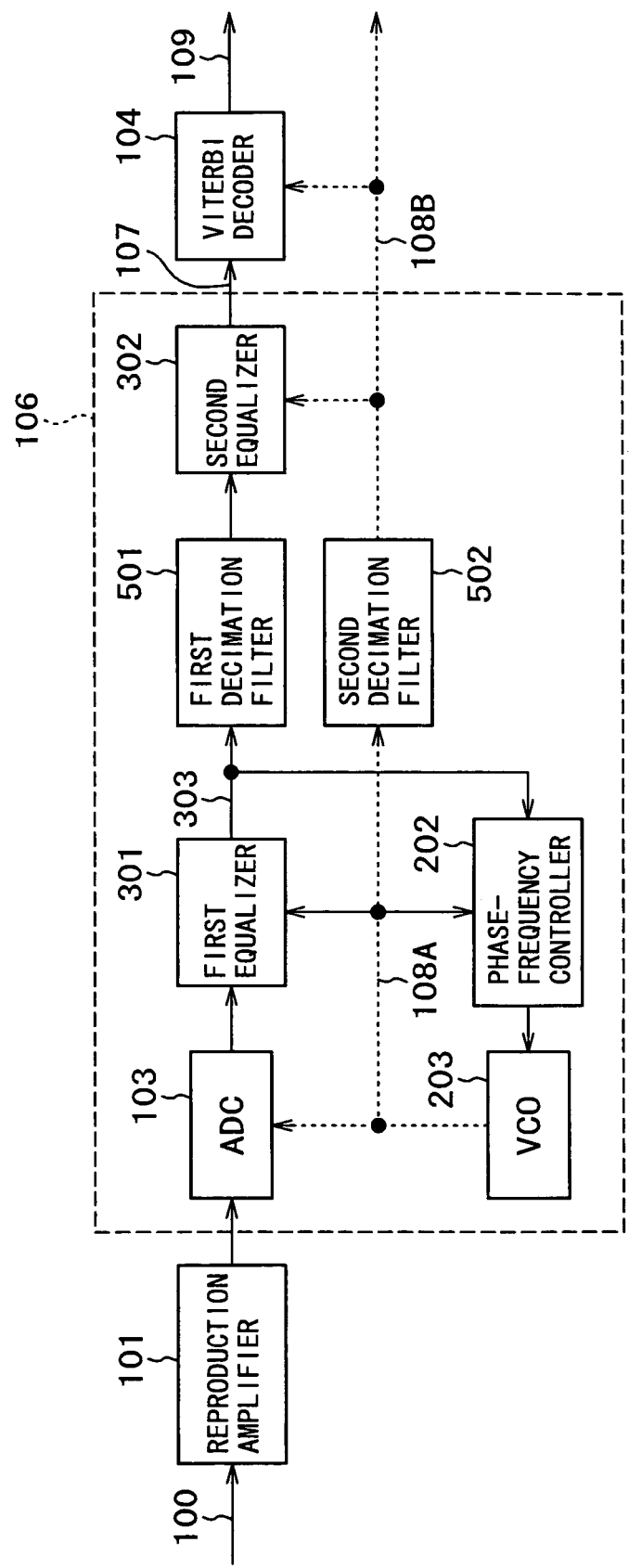
FIG. 5 is a schematic block diagram showing a reproduced waveform processing apparatus according to a fifth embodiment of the present invention.

Next, by referring to FIG. 5, a reproduced signal waveform processing apparatus according to a fifth embodiment of the present invention will be described.

The reproduced signal waveform processing apparatus according to the fifth embodiment of the present invention features in that the equalized data 303 outputted from the first equalizer 301 as described in the first embodiment is inputted to the second equalizer 302 via a first decimation filter 501, and that the reproducing clock signal 108 is inputted via a second decimation filter 502 to the second equalizer 302, a Viterbi decoder 104 and subsequent stages in the system. The reproduced signal waveform processing apparatus, as shown in FIG. 5, includes: an amplifier 101 for amplifying a reproduced signal 100 obtained from a magnetic medium via a reproducing head; an A/D converter (ADC) 103 for generating a reproduced digital data by sampling signals amplified by the amplifier 101; a first equalizer 301 for equalizing the digital data obtained in the A/D converter (ADC) 103; a first decimation filter 501 and a second equalizer 302 connected in series with the first equalizer 301 for equalizing the equalized data 303 equalized in the first equalizer 301 and input thereto; a Viterbi decoder 104 for Viterbi-decoding the reproduced data 107 generated in the second equalizer 302 and outputting data 109; a phase frequency controller 202 for accepting the equalized data 303 input from the first equalizer 301 and a reproducing clock signal 108A, detecting a phase frequency error information, and outputting a control signal in accordance with a result of the detection; and a voltage controlled oscillator (VCO) 203 for varying the oscillation cycle thereof in accordance with the control signal generated by the phase frequency controller 202, and outputting a reproducing clock signal 108A. Next, the reproducing clock signal 108A outputted from the voltage controlled oscillator 203 is supplied to the A/D converter 103, the first equalizer 301 and the phase frequency controller 202, and then, another reproducing clock signal 108B is supplied via the second decimation filter 502 to the second equalizer 302, the Viterbi decoder 104 and to subsequent stages as a system synchronizing clock signal.

Among them, the A/D converter 103, the first equalizer 301, the phase frequency controller 202 and the voltage controlled oscillator 203 make up a feedback loop which constitutes a PLL. Further, in conjunction with the feedback loop, the second equalizer 302 connected in series with the first equalizer 301 via the first decimation filter 501 and the second decimation filter 502 connected with a line of the reproducing clock signal 108A constitute the reproduced signal waveform processing apparatus according to the fifth embodiment of the present invention.

The first decimation filter 501 is provided for absorbing a difference in operation clocks between the first and the second equalizers 301 and 301, thereby even if the clock on the side of the first equalizer 302 constituting the PLL is set faster, the effect thereof will not propagate to the second equalizer 302.

The second decimation filter 502 is provided to allow the reproducing clocks 108A and 108B to be different on the side of the PLL and on the side of the second equalizer 302, and has a function to generate a reproducing clock signal 108B which is to be supplied to the second equalizer 302 and the Viterbi decoder, by dividing the reproducing clock signal 108A in the PLL block In the reproduced signal waveform processing apparatus according to the fifth embodiment, the reproduced signal 100 obtained from a magnetic medium via a reproducing head is inputted to the A/D converter 103 via the amplifier 101, and an output from the A/D converter 103 is inputted to the first equalizer 301. The equalized data 303 outputted from the first equalizer 301 is inputted to the first decimation filter 501 and the phase frequency controller 202, and an output from the phase frequency controller 202 is inputted to the voltage controlled oscillator 203. The voltage controlled oscillator 203 outputs the reproducing clock signal 108A. This reproducing clock signal 108A is divided in the second decimation filter 502 to generate the reproducing clock signal 108B to be supplied to the second equalizer 302 and the Viterbi decoder 104. The reproduced digital data 107 from the second equalizer 302 is discriminated in the Viterbi decoder 104, and data 109 is outputted therefrom.

As described above, the reproduced signal reproduced from the magnetic medium via the reproducing head is amplified in the amplifier 101, subjected to sampling in the A/D converter 103, which serves as separating means, so as to obtain a reproduced digital data. The first equalizer 301 executes digital processing of the digital signal obtained by the A/D converter 103, and outputs the equalized data 303, which is then supplied to the first decimation filter 501 and the phase frequency controller 202. The phase frequency controller 202 detects a phase frequency error information between the equalized data 303 and the reproducing clock signal 108A generated by means to be described in the following, and outputs a control signal in accordance with a result of the detection. The voltage controlled oscillator 203, which serves as oscillation means, varies the oscillation cycle thereof in accordance with the control signal supplied generated by the phase frequency controller 202, and outputs the reproducing clock signal 108A.

The reproducing clock signal 108A is divided in the second decimation filter 502 to generate the reproducing clock signal 108B, and then, the reproducing clock signal 108B is supplied to the second equalizer 302 and the Viterbi decoder 104.

Here, the A/D converter 103, the first equalizer 301, the phase frequency controller 202 and the voltage controlled oscillator 203 make up a feedback loop, which constitutes a phase locked loop (PLL) for the reproduced signal 100 and the reproducing clock signal 108A.

On the other hand, the second equalizer 302, by having the first decimation filter 501 to absorb a difference in the operating clocks, equalizes an equalization error remaining in the equalized data 303, and outputs the reproduced data 107. The Viterbi decoder 104 obtains data 109 through Viterbi-decoding from the reproduced data 107 equalized in the second equalizer 302.

By provisions of the first and the second decimation filters 501 and 502 as described above, it becomes possible to change a clock speed on the sides of the PLL and the second equalizer 302. In other words, an operating clock of a phase locked loop (PLL) may be increased, or, the operating clock may be operated at a frequency that is multiplication of an operating clock on the side of the second equalizer 302. Accordingly, the loop gain thereof may be increased, and it becomes possible to achieve a wider pull-in frequency range and higher frequency tracking capability.

Figure 6:
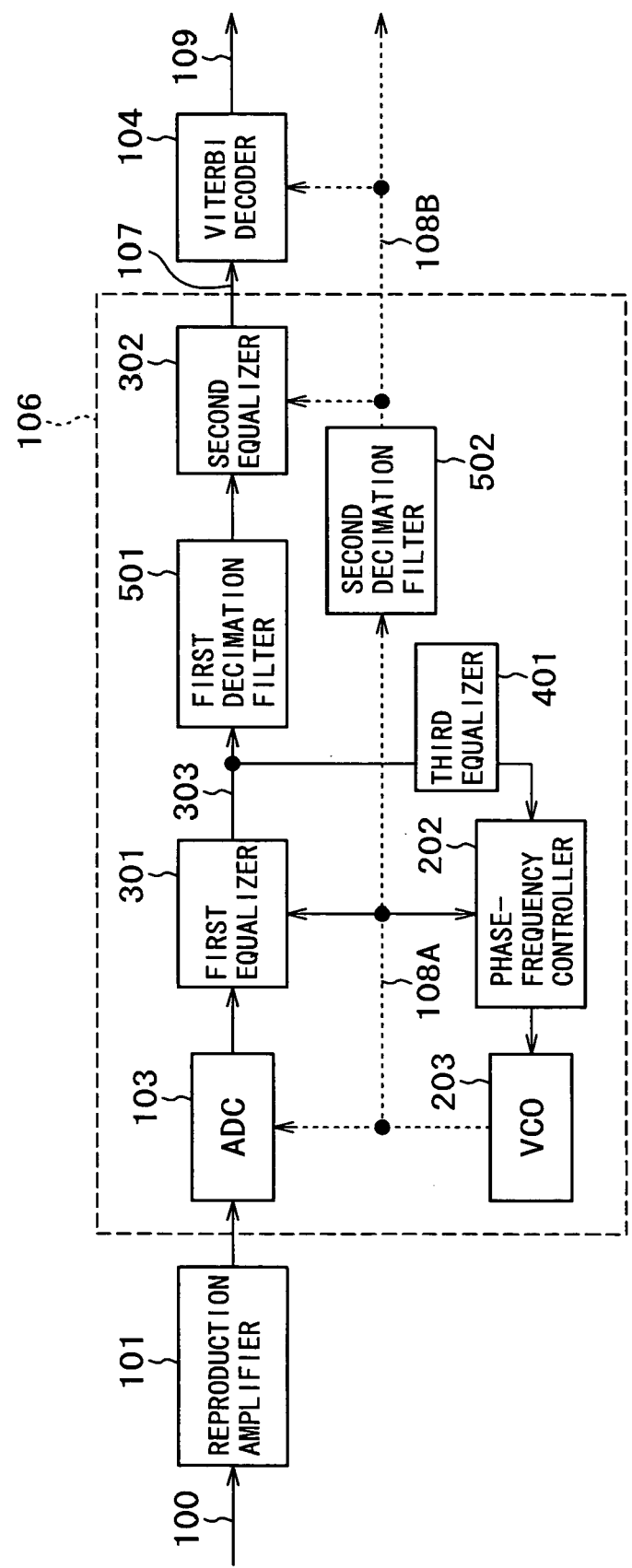
FIG. 6 is a schematic block diagram showing a reproduced waveform processing apparatus according to a sixth embodiment of the present invention.
Figure 7:
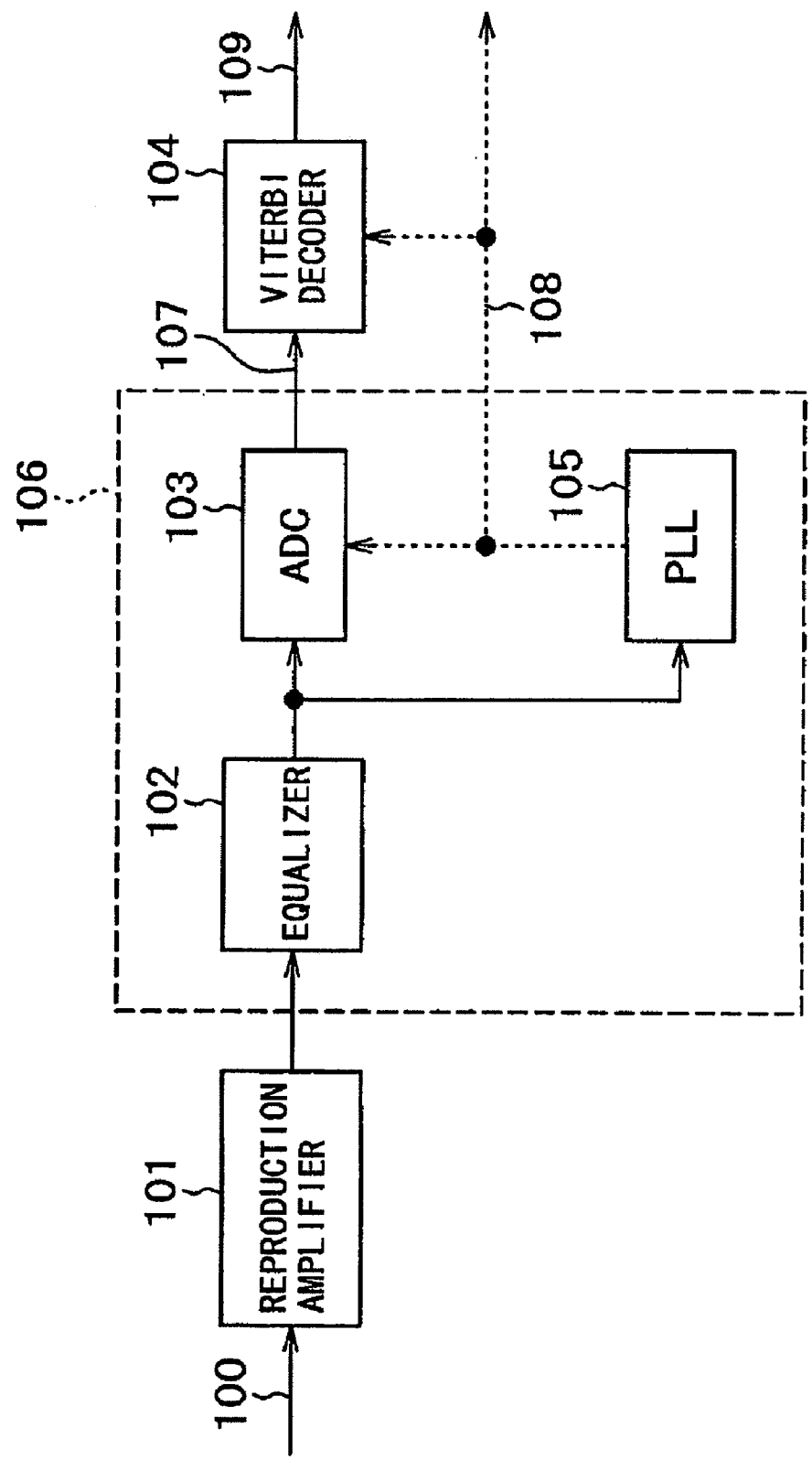
FIG. 7 is a block diagram showing an analog PLL circuit of a conventional type.
Figure 8:
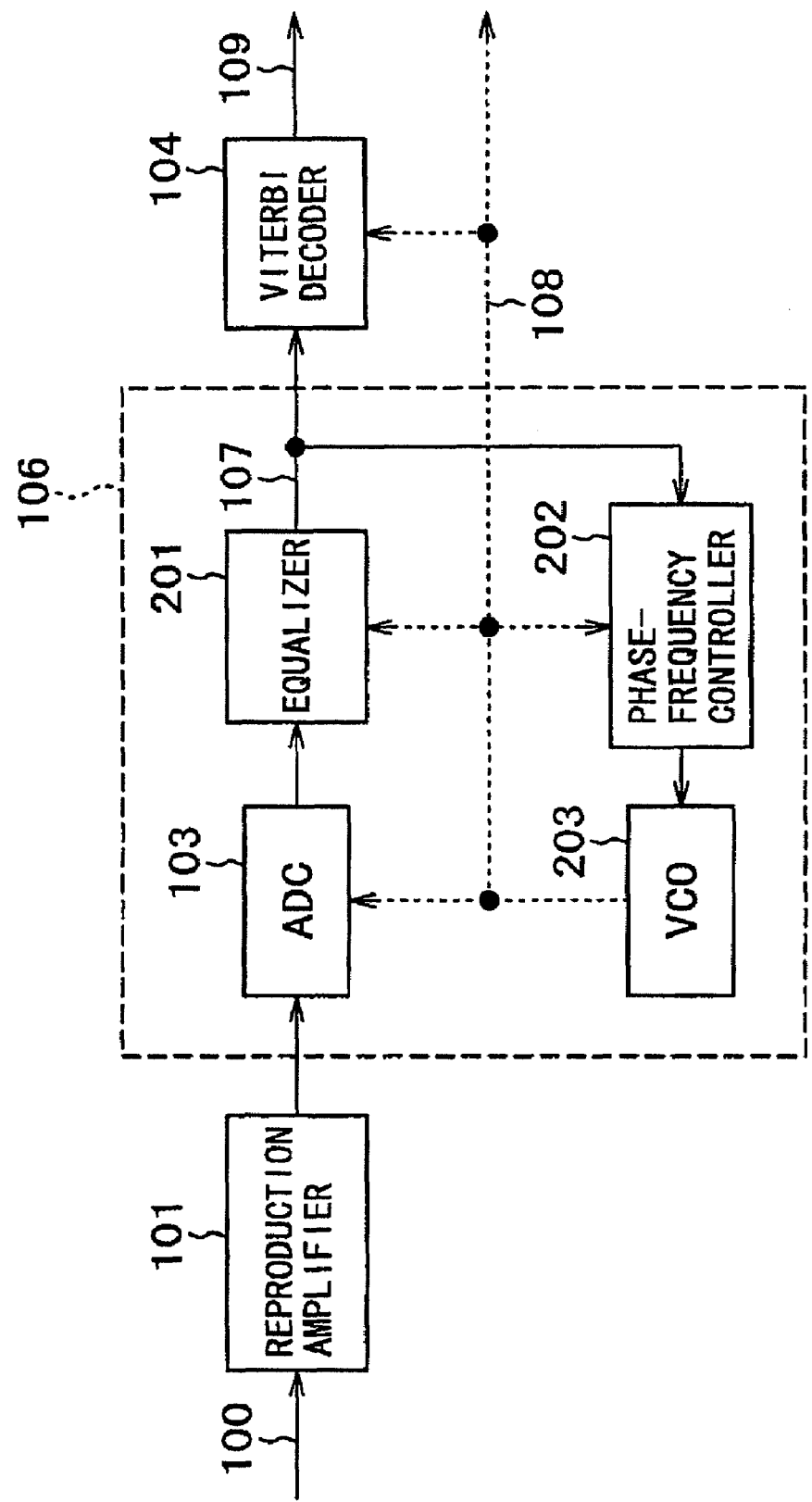
FIG. 8 is a block diagram showing a digital PLL circuit of a conventional type.

By referring to FIG. 6, a reproduced signal waveform processing apparatus according to a sixth embodiment of the present invention will be described.

The reproduced signal waveform processing apparatus according to the sixth embodiment of the present invention features in that: the equalized data 303 outputted from the first equalizer 301 in the first embodiment described above is inputted to the second equalizer 302 through the first decimation filter 501; the reproducing clock signal 108A is, as the reproducing clock signal 108B via the second decimation filter 502, supplied to the second equalizer 302, a Viterbi decoder 104 and to subsequent system stages; and the third equalizer is further provided between the first equalizer 301 and the phase frequency controller 202. As shown in FIG. 6, the reproduced signal waveform processing apparatus includes: a reproducing amplifier 101 for amplifying a reproduced signal 100 obtained from a magnetic medium via a reproducing head; an A/D converter (ADC) 103 for generating a reproduced digital data by sampling the reproduced signal amplified by the amplifier 101; a first equalizer 301 for equalizing the digital data obtained by the A/D converter 103 and outputting an equalized data 303; a first decimation filter 501 and a second equalizer 302 connected in series with the first equalizer 301 for equalizing the equalized data 303 generated by the first equalizer 301 and outputting a reproduced data 107; a Viterbi decoder 104 for Viterbi-decoding the reproduced data 107 generated by the second equalizer 302 and outputting data 109; a third equalizer 401 for equalizing the equalized data 303 from the first equalizer 301; a phase frequency controller 202 for accepting the equalized data 304 input from the third equalizer 401 and a reproducing clock signal 108A, detecting a phase frequency error information, and outputting a control signal in accordance with a result of the detection; and a voltage controlled oscillator (VCO) 203 for varying the oscillation cycle thereof in accordance with the control signal from the phase frequency controller 202, and outputting a reproducing clock signal 108A. The reproducing clock signal 108A outputted from the voltage controlled oscillator 203 is inputted to the A/D converter 103, the first equalizer 301 and the phase frequency controller 202. Further, the reproducing clock signal 108A is outputted to the second decimation filter 502 where it is converted into the reproducing clock signal 108B, which is then input to the second equalizer 302 and the Viterbi decoder 104 as a system synchronization clock signal in the subsequent stages.

The first decimation filter 501 is provided for absorbing a difference in the operating clocks of the first equalizer 301 and the second equalizer 302, thereby even if the operating clock on the side of the first equalizer 301 constituting the PLL is set faster, the influence thereof will not propagate to the second equalizer 302.

The second decimation filter 502 is provided for allowing a difference between reproducing clocks on the side of the PLL and on the side of the second equalizer 302 to exist, and has a function of a frequency divider for dividing the reproducing clock signal 108A in the PLL block and generate the reproducing clock signal 108B to be supplied to the second equalizer 302 and the Viterbi decoder.

The third equalizer 401 is adapted to enable variation of the frequency and phase characteristics of a signal to be input to the phase frequency controller 202, thereby allowing generation of the characteristics of the signal in such a way that an error therein may be more easily detected by the phase frequency controller 202. Accordingly, it becomes possible to allow a wider range of variations in products such as tapes, reproducing heads and the like as well as for fluctuations resulting from ageing thereof.

In the reproduced signal waveform processing apparatus having the aforementioned arrangement, the reproduced signal 100 obtained from the magnetic medium via the reproducing head is inputted to the A/D converter 103 via the amplifier 101, and an output from the A/D converter 103 is inputted to the first equalizer 301. The equalized data 303 outputted from the first equalizer 301 is inputted to the first decimation filter 501 and to the phase frequency controller 202, and an output from the latter is inputted to the voltage controlled oscillator 203. Next, the voltage controlled oscillator 203 outputs the reproducing clock signal 108A. This reproducing clock signal 108A is divided in the second decimation filter 502 so as to generate the reproducing clock signal 108B to be supplied to the second equalizer 302 and the Viterbi decoder 104. Next, the reproduced data 107 outputted from the second equalizer 302 is discriminated in the Viterbi decoder 104 to be outputted as data 109.

As described hereinabove, the reproduced signal 100 reproduced from the magnetic medium via the reproducing head is amplified in the amplifier, then subjected to sampling in the A/D converter 103, which serves as separating means, so as to obtain the reproduced digital data. The first equalizer 301 executes digital processing of the digital signal obtained by the A/D converter 103 and outputs the equalized data 303, which is then supplied to the first decimation filter 501 as well as to the phase frequency controller 202. The phase frequency controller 202 detects a phase frequency error information of the equalized data 303 and the reproducing clock signal 108A supplied from the voltage controlled oscillator, and outputs a control signal on the basis of a result of the detection. The voltage controlled oscillator 203 varies the oscillation cycle thereof in accordance with the control signal fed from the phase frequency controller 202, and accordingly outputs the reproducing clock signal 108A.

The reproducing clock signal 108A is divided in the second decimation filter 502 so as to generate a reproducing clock signal 108B, and the reproducing clock signal 108B is then supplied to the second equalizer 302 and the Viterbi decoder 104.

Here, the A/D converter 103, the first equalizer 301, the phase frequency controller 202 and the voltage controlled oscillator 203 constitute a feedback loop, which forms a phase locked loop (PLL) for the reproduced signal 100 and the reproducing clock 108.

On the other hand, by absorbing the clock difference in the first decimation filter 501, the second equalizer 302 equalizes a residual equalization error remaining in the equalized data 303, and outputs a reproduced data 107. The Viterbi decoder 104 obtains data 109 through Viterbi-decoding from the reproduced data 107 equalized in the second equalizer 302.

Accordingly, an operating clock in the phase locked loop may be increased. Accordingly, its loop gain may be set higher, and it becomes possible to obtain a wider pull-in frequency range and a higher frequency tracking capability.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A reproduced signal waveform processing apparatus, comprising:
    a feedback loop comprising sampling means for sampling a reproduced signal at an interval of a reproducing clock signal generated at a predetermined oscillation frequency;
    a first equalizer for equalizing a digital reproduced signal obtained by the sampling means;
    phase frequency control means for detecting a phase error at a frequency between the digital reproduced signal equalized in the first equalizer and the reproducing clock signal, and outputting a control signal in accordance with phase frequency error information between the digital reproduced signal and the reproducing clock signal;
    oscillation means for varying a oscillation frequency in accordance with an instruction from the phase frequency control means,
    wherein the feedback loop is a synchronization circuit that functions as a phase locked loop (PLL) for synchronizing frequency phase between the digital reproduced signal and the reproducing clock signal, and wherein the reproduced signal waveform processing apparatus further comprises a second equalizer connected in series with the first equalizer; and
    a decimation filter provided between the first and the second equalizers for absorbing a difference in operating clocks of the first and the second equalizers, and a frequency divider for dividing the reproducing clock signal in the feedback loop and generating a reproducing clock signal that is supplied to the second equalizer.

2. The reproduced signal waveform processing apparatus according to claim 1, wherein the second equalizer means comprises an adaptive equalizer having an automatic equalization function.

3. The reproduced signal waveform processing apparatus according to claim 1, wherein the first equalizer comprises an IIR filter.

4. The reproduced signal waveform processing apparatus according to claim 1, wherein the phase frequency control means comprises a FIR filter.

5. The reproduced signal waveform processing apparatus according to claim 1, wherein an operating clock of the feedback loop is operated at a frequency that is a multiplication of an operating clock of the second equalizer.

6. The reproduced signal waveform processing apparatus according to claim 1, wherein the sampling means is an analog/digital converter.

* * * * *